Oct. 17, 1933.  W. H. GERSTENSLAGER  1,930,747
MANUFACTURE OF RUBBER BELTS
Filed Feb. 27, 1931  2 Sheets-Sheet 1
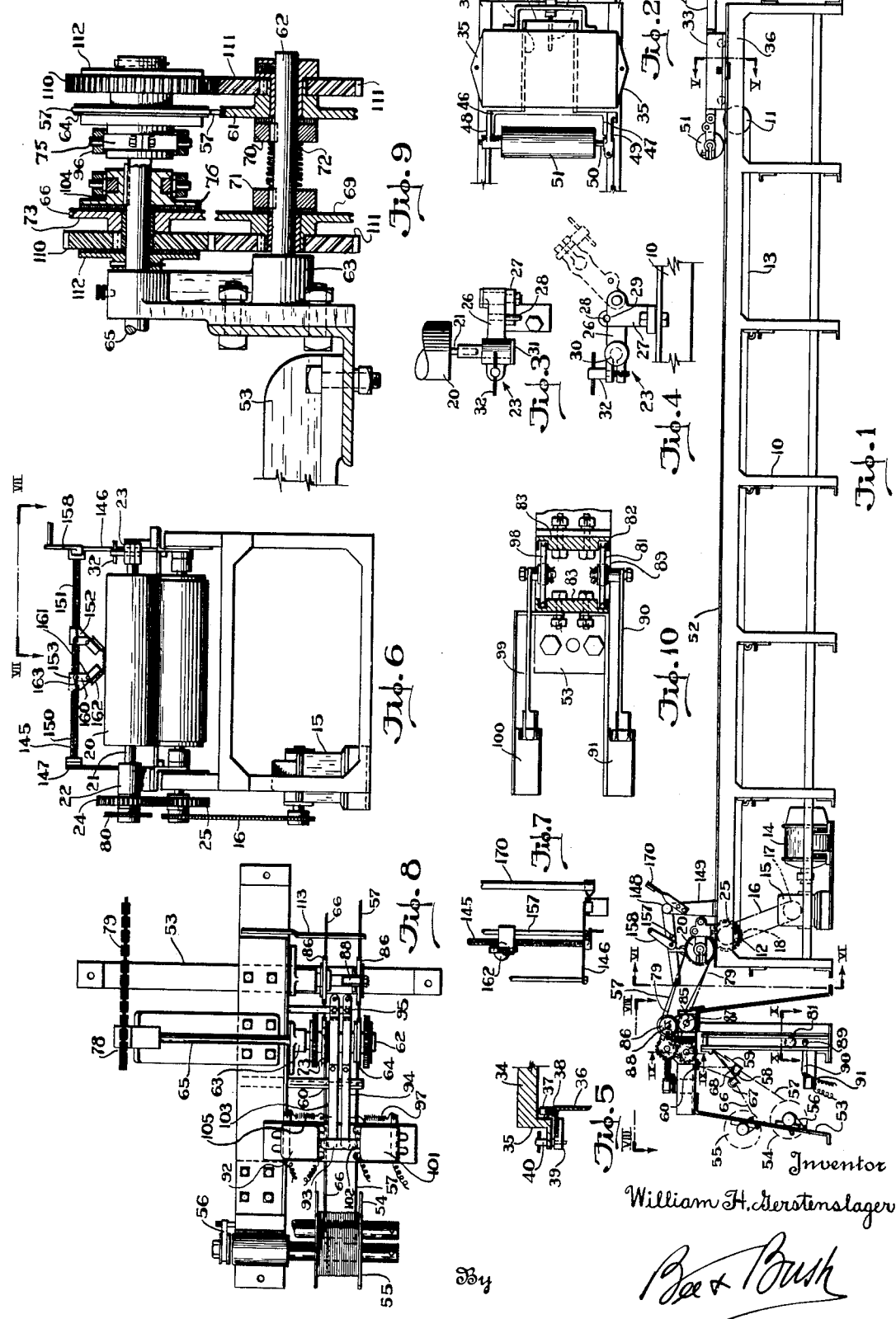
Inventor
William H. Gerstenslager.
By
Bee & Bush
Attorneys Oct. 17, 1933.    W. H. GERSTENSLAGER    1,930,747
MANUFACTURE OF RUBBER BELTS
Filed Feb. 27, 1931    2 Sheets-Sheet 2
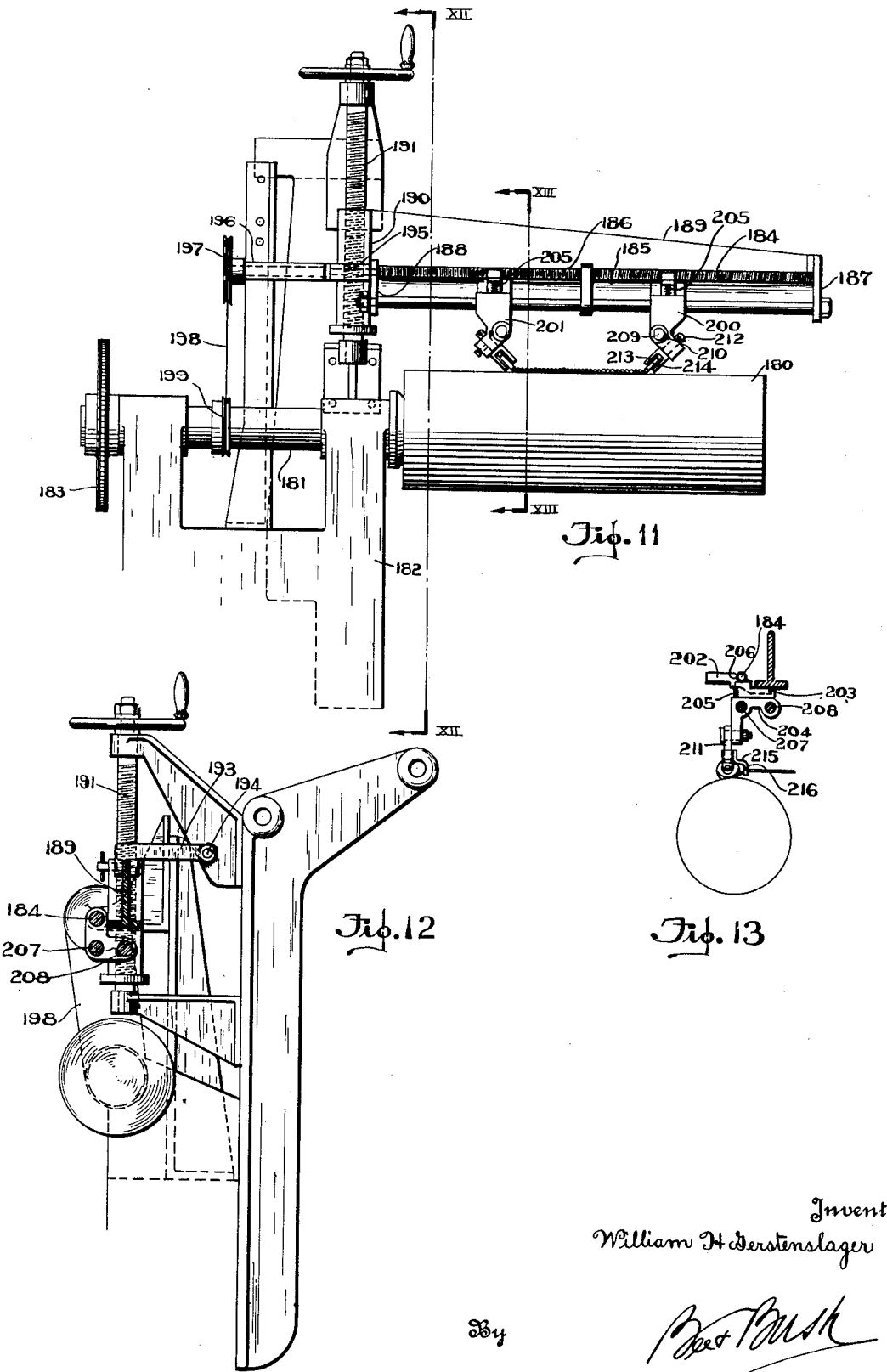
Inventor
William H. Gerstenslager
By
Attorneys Patented Oct. 17, 1933

1,930,747

UNITED STATES PATENT OFFICE 1,930,747

MANUFACTURE OF RUBBER BELTS

William H. Gerstenslager, Akron, Ohio, assignor to Wingfoot Corporation, Wilmington, Del., a corporation of Delaware Application February 27, 1931. Serial No. 518,781

16 Claims. (Cl. 154—4)

This invention relates to the manufacture of rubber belting, and it relates particularly to the manufacture of belting having a load-transmitting element comprising a series of cords.

One object of the invention is to provide a method of assembling belt tensile elements such as cords, with a rubberized fabric envelope under predetermined tensions.

Another object of the invention is to provide a method of accurately manufacturing an endless cord belt of predetermined length.

Another object of the invention is to provide an apparatus for manufacturing cord belting by means of which a plurality of cords may be wound into adjacent convolutions under substantially equal tensions.

Another object of the invention is to provide apparatus for manufacturing an endless cord belt comprising a rubberized fabric envelope and a plurality of convolutions of cord, which facilitates assembling the cords and fabric in a uniform manner.

Another object of the invention is to provide a device for maintaining uniform tension on a cord as it is applied to a belt-assembling apparatus.

Rubberized cord belting has been manufactured by winding a strip of rubberized fabric about a pair of spaced pulleys and subsequently stitching or sewing its ends together. Then cords were wound about the band of fabric, the edges of the fabric folded about the cords, and the assembly vulcanized between platens of a press adapted for this purpose. Insofar as the applicant is aware, the cords were guided about the band of fabric manually, and although they could be assembled in substantially proper relation, an accurate and uniform application of the cords was not insured. Furthermore, the tension under which the fabric and cords were assembled, varied, and in the finished belt the cords did not always constitute the load-transmitting portion of the belt in the manner considered most practical, and even the length of the belt could not be accurately predetermined.

Furthermore, when a plurality of cords were wound about the endless band of fabric, the tension under which the cords were applied varied, and frequently the cords in one portion of the belt were applied under one tension while those at another portion of the belt were applied under a different tension. Consequently, when a belt so assembled was operated for transmitting power over crowned pulleys particularly, it had a tendency to move sidewise and finally disengage itself from one of the pulleys.

According to the invention, the undesirable features of the prior belt manufacturing methods are obviated, and the manufacture of rubber belting having properly tensioned elements which are uniformly assembled, is insured. One form of the invention comprises a pair of adjustably spaced pulleys journaled at one end in bearing brackets which may quickly be disengaged therefrom. Initially, the ends of a piece of elongate rubberized fabric of predetermined length, are stitched or sewed together, thereby providing an endless band accurately defining the peripheral length of the belt of which the fabric will comprise a part. This band of fabric is slipped over the free ends of the pulleys, the bearing brackets at such ends of the pulleys are moved to their operative positions and the pulleys adjusted relatively until the fabric is sufficiently slack between the pulleys that the upper side sags into substantial contact with the lower side.

One of the pulleys is driven by an electric motor, and the band of fabric initially is positively moved about the pulleys by a driven endless, conveyor belt upon which the lower side of the fabric between the pulleys is supported. Then a plurality of cords are wound about the band of fabric preferably by initially placing two cords in side-by-side relation centrally of the band where they are held by the friction of the rubber with which they and the band are coated and progressively winding each cord into a plurality of convolutions disposed side-by-side. Devices for subjecting each cord to a predetermined tension, are utilized to insure the application of both of the cords under equal tension. As the cords are so wound, automatically operating guiding devices position them in uniformly arranged convolutions. After one or more convolutions of cord are wound about the fabric end of the pulleys, the portions of the fabric extending between the pulleys become less slack and finally when all of the convolutions of cord are applied, the band of fabric and cords become more or less taut between the pulleys. Then the edge portions of the fabric are folded about the cords manually, the removable bearing brackets disengaged from the pulleys, and the assembled belt is removed and vulcanized between platens of a press for this purpose.

Practice of the invention insures that the endless belt manufactured will be substantially equal in length to the predetermined length indicated by the endless band of fabric prior to the assembling of cords therewith. Consequently, when it is desired to manufacture a cord belt of a certain length, undesirable variations from this length in the finished belt do not exist. This result of the invention is of considerable importance, because of the fact that cord belting usually is manufactured in endless form. Satisfactory mechanical belt connections such as are used in connecting the ends of woven fabric belting have not been employed commercially in such manner that a belt manufacturer may send an elongate piece of cord belting to a purchaser, relying on the latter to connect the ends of the belt in a practical manner.

For a better understanding of the invention, reference may now be had to the accompanying drawings, forming a part of this specification, in which Fig. 1 is a side-elevational view of a belt manufacturing apparatus constructed according to one form of the invention;

Fig. 2 is a fragmentary plan view of the construction shown by Fig. 1, illustrating the manner of mounting a belt retaining pulley;

Fig. 3 is a fragmentary plan view taken on a larger scale, of the construction shown by Fig. 2, illustrating a removable bearing bracket associated with one end of the pulley;

Fig. 4 is an end elevational view of the construction shown by Fig. 3;

Fig. 5 is a fragmentary cross-sectional view taken substantially along the line V—V of Fig. 1;

Fig. 6 is an end elevational view on a larger scale, taken substantially along the line VI—VI of Fig. 1;

Fig. 7 is a fragmentary plan view of the construction shown by Fig. 6 taken substantially along the line VII—VII, of Fig. 6;

Fig. 8 is a fragmentary plan view of the construction shown by Fig. 1, on a larger scale, taken substantially along the line VIII—VIII thereof;

Fig. 9 is a cross-sectional view on a larger scale, taken substantially along the line IX—IX of Fig. 1.

Fig. 10 is a cross-sectional view, on a larger scale, taken substantially along line X—X of Fig. 1;

Fig. 11 illustrates a modified form of the invention, wherein a plurality of cord guiding devices operate in synchronism with a driven belt-supporting member;

Fig. 12 is a cross-sectional view taken substantially along the line XII—XII of Fig. 11, and Fig. 13 is a cross-sectional view taken substantially along the line XIII—XIII of Fig. 11.

Referring to Fig. 1, a framework 10 is provided having a pair of spaced pulleys 11 and 12 about which an endless conveyor belt 13 is trained. A motor 14 is employed to drive the roller 12 and conveyor 13 by means of a reduction gearing 15. A chain 16 is trained about a sprocket wheel 17 connected to a shaft projecting from the reduction gearing, and a sprocket wheel 18 rigidly associated with the roller 12.

As best shown by Fig. 6, a second roller 20 is mounted on the framework 10 above the roller 12, which has a shaft 21 journaled in a pair of bear-brackets 22 and 23 secured to opposite sides of the framework. Adjacent the bearing 22, the shaft 21 is provided with a pinion 24 meshing with a pinion 25 rigidly associated with the roller 12 by means of which the shaft 21 is positively driven by the motor 14. As best shown by Figs. 3 and 4, the bearings 23 comprises an arm 26 pivotally connected at one end to a bracket 27 and projecting upwardly from the framework 10. Normally, the arm 26 is retained in a horizontal position by means of a pin 28 which engages a notch 29 in the upper side of the bracket 27. The free end of the arm 26 is bifurcated and is provided with a circular opening 30 in which a sleeve 31 normally is disposed. An extended portion of the sleeve 31 normally engages the shaft 21. The portions of the bifurcated end of the arm 26 are adjustably clamped together by means of a screw 32 and when it is necessary to disengage the bearing 23 from the shaft 21, the screw is turned until the sleeve 31 may be moved through the opening 30 sufficiently to disengage it from the shaft. Then the arm 26 is moved about its pivotal connection with the bracket 27, thereby permitting access to the roller 20.

As shown by Figs. 1, 2 and 5, a slide 33 is mounted upon the framework 10, which comprises a base 34 having angle portions 35 disposed directly above angle bars 36 disposed at opposite sides of the framework. Referring to Fig. 5 particularly, each of the angle portions 35 on the base 34 is provided with a roller 37 which engages a metal bar 38 especially adapted to resist wear when the roller is moved upon it. The base 34 is adapted to be rigidly secured to the angle bars 36 by means of a clamp 39 engaging the lower side of one portion of the angle bar, which is releasably secured to the angle portion 35 of the base by means of a screw 40. Referring to Fig. 2, the central portion of the base 34 is provided with an internal opening 41 constituting a guide for a slide 42 which is adjustable with respect to the base by means of a screw 43 threaded into the slide and rotatably but non-slidably journaled in a bracket 44 rigidly secured to the base. A hand wheel 45 on the free end of the screw 43 facilitates its operation. Also, the slide 42 is provided with transversely extending portions 46 and 47, to which a pair of bearing brackets 48 and 49 are secured, respectively. The bearing bracket 48 preferably is rigidly connected to the transversely extending portion 46 of the slide 42 and supports one end of a shaft 50 which extends through a roller 51. The bearing bracket 49 is substantially identical to the bearing bracket 23 illustrated by Figs. 3 and 4, but is mounted on the transversely extending portion 47 of the slide 42, instead of on the framework 10. When the bearing brackets 23 and 49 are disengaged from the rollers 20 and 51, respectively, and moved to their inoperative positions, the ends of the rollers adjacent the bearing brackets are so exposed that a band of fabric, for example, may be mounted on or removed from the rollers.

The operation of the apparatus so far described is as follows: An endless band of rubberized fabric 52, preferably bias cut fabric, is constructed by cutting an elongate piece of such fabric to a length equal to the circumferential length of the endless belt to be manufactured. The ends of this strip of fabric then are stitched or sewed together, and the band is slipped over the rollers 21 and 51. Then the bearing brackets 23 and 49 are engaged with the shaft 21 and 50 of the rollers, and the base 34 and slide 42 are adjusted until the band of fabric is associated with the rollers in such condition that preferably both sides of the band are supported by the upper side of the endless conveyor belt 13 and when the latter is driven it moves the band about the rollers.

Referring to Figs. 1, 8, 9 and 10, an apparatus for winding cords about the band of fabric 52 comprises an auxiliary frame 53 located adjacent the end of the framework 10 and the roller 20 which rotatably supports reels of cord 54 and 55. Friction brake bands 56 cooperating with the reels 54 and 55 serve to prevent excessive rotation of the reels when cords are unwound therefrom. A cord 57 from the reel 54 is trained about a roller 58 journaled in one end of a spring bar 59 connected at one end to the framework 53 through a guide bar 60 and then about a grooved pulley 61 rotatably mounted on a shaft 62 rigidly secured at one end in a bearing bracket 63 mounted on the upper portion of the framework. Then the cord 57 extends upwardly over a grooved pulley 64 which is rotatably mounted on a shaft 65 that is journaled in the bearing bracket 63. A cord 66 from the reel 55 similarly extends about a roller 67 journaled in the free end of the spring bar 68 secured to the framework 53, through another portion of the guide 60, and then about a grooved pulley 69, also rotatably mounted on the shaft 62, but in spaced relation with respect to the pulley 61. The pulleys 61 and 69 are maintained in spaced relation by a pair of friction elements 70 and 71, which are splined to the shaft 62 and maintained against the adjacent surfaces of the pulleys by a spring 72 encircling the shaft between the clutch elements. Normally, the clutch elements 70 and 71 retard rotation of the pulleys 61 and 69 because of the frictional engagement between such clutch elements and the pulleys.

The cord 66 also extends over a pulley 73 which, like the pulley 64, is rotatably mounted on the shaft 65. A pair of clutch elements 75 and 76 splined to the shaft 65 between the pulleys 64 and 73, when engaged with the pulleys respectively, connect the shaft 65 operatively with the pulleys, and consequently when the shaft 65 is driven, the pulleys 64 and 73 likewise are driven. The shaft 65, as best shown by Fig. 8, is provided with a sprocket wheel 78 and a chain 79 trained about the latter also is trained about a sprocket wheel 80 (Fig. 6) on the shaft 21. Hence, the motor 14 serves to drive the shaft 65.

The cord 57 then extends downwardly from the pulley 64 and is trained about a grooved disc 81 which is free to slide vertically in grooves 82 in adjacent sides of a pair of spaced bars 83 forming part of the framework 53. The disc, because of its weight, serves to maintain a surplus of cord below the pulley 64, and if the cord should be withdrawn more rapidly from the apparatus than it is withdrawn from the reel 54, the discs will move upwardly. Furthermore, the disc serves to maintain uniform tension on the cord as it is unwound.

The cord 57 then extends upwardly and about a pair of vertically spaced pulleys 85 and 86 journalled on shafts 87 and 88 respectively, projecting from the framework 53 adjacent the shafts 62 and 65. From the upper pulley 86, the cord extends to the roller 20 on the framework 10.

The disc 81 in its lowest position between the bars 83, engages a roller 89 journalled in the free end of an arm 90 which is operatively associated with an electric switch indicated generally at 91 (Fig. 10). The switch 91, when closed by downward movement of the arm 90, completes an electrical circuit through a solenoid 92, (Fig. 8) mounted on the framework 53. A link 93 associated with the solenoid, is pivotally connected to the free end of an arm 94 pivoted to the framework, as indicated at 95, and which is associated with a clutch 96 (Fig. 9) on the shaft 65 adjacent the pulley 64. A spring 97 connecting the free end of the arm 94 normally retains the arm in such position that the clutch engages the pulley and operatively connects it to the shaft 65. Accordingly, the cord is positively withdrawn from the reel 54 as long as the disc 81 is above the roller 89 on the switch operating arm 90, but as soon as the disc moves the latter, the pulley 64 is disconnected from the shaft 65 and cord is not unwound from the reel until the disc disengages the roller. This arrangement insures a free floating movement of the disc and consequently, the application of uniform tension to the cord at all times.

The cord 66, similarly to the cord 57, extends about a disc 98 vertically slidable in other grooves 82 in the bars 83 and is adapted to operate an arm 99 associated with a switch 100 associated with a solenoid 101 mounted adjacent the solenoid 92. The latter is associated with a link 102 pivotally connected to an arm 103 pivoted to the framework 53, and which is operatively connected to a clutch 104 on the shaft 65 adjacent the pulley 73. A spring 105 connecting the arm 103 to the framework 53 normally maintains the clutch 104 in engagement with the pulley 73.

Gears 110 keyed to opposite ends of the shaft 65 mesh with gears 111 on the shaft 63, thereby connecting the two shafts in driving relation. Friction elements 112 rigidly secured to the shaft 65 at the remote sides of the gears 110 cooperate with the clutch elements 96 and 104 in order to connect the gears to the shaft when the clutch elements are moved toward the gears by the springs 97 and 105.

The cords 57 and 66 are directed to the roller 20 over a guide bar 113 on the framework 53 and initially are stitched to the fabric 52 in juxtaposition centrally of the latter. As the band is moved about the rollers 20 and 51, and the cords are unwound, convolutions of the respective cords progressively approach opposite edges of the band of fabric. The cord guiding apparatus comprises a screw 145 journaled at its opposite ends in arms 146 and 147, which are pivoted as indicated at 148 to the upper end of a standard 149 mounted on the framework 10. The screw 145 comprises oppositely threaded portions 150 and 151, and such threaded portions extend respectively through a pair of blocks 152 and 153 having internally threaded openings corresponding to a threaded portion of the screw. For preventing rotation of the blocks 152 and 153 as the screw is turned, a guide bar 157 is provided which extends between the arms 147 and 146 and slidably through openings in the blocks. A crank 158 on one end of the screw 145 facilitates rotation thereof. Each of the blocks 152 and 153 is provided with a bell crank 160 pivoted to the block as indicated at 161, which has a small grooved roller 162 journaled in one end. The opposite end of the bell crank is connected by means of a spring 163 to the block. The arms 161 are so arranged that the rollers 162 are disposed in converging planes directed toward the pulley 20, and accordingly, are adapted to lay the cords as they are wound about the endless band of fabric, in side-by-side convolutions. The springs 163 permit winding of a number of convolutions of cord without requiring manipulation of the crank 158. After several convolutions of cord are wound about the endless band of fabric, it is then necessary to turn the crank 158 to dispose the rollers 162 in new positions.

After the required number of convolutions of cord are wound about the endless band of fabric, the cords are cut, the arms 146 and 147 moved to an inoperative position in which they are supported by a bracket 170 projecting from the standard 149, and then during continued movement of the endless band of fabric about the pulleys 40, the edge portions of the fabric are manually folded about the cords and stitched in overlapping relation. Then the endless band of fabric is removed and vulcanized according to ordinary practice.

According to Fig. 11, an apparatus is provided for winding the cords about a belt-supporting member such as a collapsible drum 180 in synchronism with the movement of the latter. The drum is mounted on a shaft 181 journalled in a standard 182, and is positively driven by a sprocket wheel-chain connection 183 connected to a motor (not shown). The cord guiding apparatus comprises a screw 184 having oppositely threaded portions 185 and 186 journaled at opposite ends in plates 187 and 188 depending from a bar 189 extending transversely above the drum 180. The bar 189 has an internally threaded sleeve portion 190 threaded on a vertically disposed screw 191 having its opposite ends journalled in bearings forming part of the standard 182. A hand wheel on one end of the screw 191 facilitates turning of the latter, and accordingly, vertical adjustment of the bar 189. It is apparent that the bar 189 may be swung about the screw 191 as a pivot, into a position directly above the drum or into a position where it will not interfere with the winding of belt material on the drum, or collapsing of the drum after the belt material is assembled on it. A latch 193 (Fig. 12) pivoted to the standard 182, as indicated at 194, is adapted to engage the bar 189 and maintain it in its operative position directly above the drum.

One end of the screw is provided with a cylindrical flexible connection 195 splined thereon, by means of which the screw may be releasably connected with a shaft 196 journalled in the standard 182, and which is provided with a pulley 197 connected by a cable 198 to a pulley 199 on the shaft 181.

On the oppositely threaded portions of the screw 184, a pair of cord guiding devices 200 and 201, respectively, are mounted. These devices are identical and consequently one of them only needs to be described. As best shown by Fig. 13, each of the devices comprises an arm 202 pivoted at one end, as indicated at 203 to a block 204 between a bifurcated portion thereof and separated from the block at its other end by a spring 205. The upper side of the arm 202 is provided with a semi-circular, threaded opening 206 which engages a semi-circular portion of the screw 184. Consequently, the arm 202 may be readily disengaged from the screw. The block is slidably mounted on rods 207 and 208 extending between the plates 187 and 188, and when the arms 202 threadedly engage the screw 184 and the latter is rotated, the blocks can be moved longitudinally of the rods. An arm 211 is rigidly secured to the lower end of the block 204 by means of a bolt 209 and a pin 210, which prevents rotation of the arm with respect to the bolt. A pin 212 projecting through an opening in the arm 211 has a lower bifurcated end 213 between the portions of which a grooved roller 214 is journaled. The roller 214 guides a cord as it is wound about the drum 180, and because of the threaded connection between the device 200 and the screw 184, the roller 214 is moved in accordance with the winding of the cord. The speed of rotation of the screw 185 with respect to the movement of the drum 180 is such that the roller 214 moves transversely during one rotation of the drum at a distance equal to the diameter of one of the cords being wound on the drum. For further guiding the cord as it is applied to the drum 180, a bracket 215 having an eye 216, is secured to the arm 211. The cord is threaded through the eye 216. When it is desired to move either of the devices 200 and 201, or both of them, with respect to the screw 184, it is necessary only to depress the arms 202, thereby disengaging them from the latter, and then moving the devices to any position desired. When two cords are wound on the drum, it is necessary to move the blocks to a position centrally of the drum and this is accomplished readily by disengaging the blocks from the screw and manually moving them to their new positions. Particularly, the apparatus shown by Figs. 11, 12 and 13 is adapted for building an endless band of vulcanizable material on a collapsible drum. Then the band is cut into narrow, annular cores, each of which constitutes the core of a belt of V-shape.

It is apparent from the foregoing description that the mechanism provided facilitates the manufacture of endless cord belts and insures uniform application of the cords to an endless band of fabric or to a collapsible drum. Furthermore, use of the mechanism insures application of the cords under uniform tension, which is very desirable, particularly in the manufacture of wide, endless flat belts, where a difference in the tension of the cords applied would result in the belt having a tendency to slip sidewise of crowned pulleys over which it subsequently operates. The apparatus has increased the efficiency of manufacturing cord belts either of the endless flat type or of the V-type, and has added considerably to successful application of belts of this character in various capacities.

Although only the preferred form of the invention has been described and shown in detail, it will be apparent to those skilled in the art that the invention is not so limited but that various minor modifications may be made therein, without departing from the spirit of the invention, or from the scope of the appended claims.

What I claim is:

1. The method of manufacturing cord belts which comprises building an endless band of rubberized fabric, disposing the band in slack condition about a pair of spaced pulleys, winding cords about the slack band of fabric, folding edge portions of the fabric about the cords and vulcanizing the assembly.

2. The method of manufacturing cord belts which comprises building an endless band of rubberized fabric, disposing the band in slack condition about a pair of spaced pulleys, winding cords under tension about the slack band of fabric, folding edge portions of the fabric about the cords and vulcanizing the assembly.

3. An apparatus for building cord belts which includes spaced, parallel pulleys adapted to carry the belt therebetween, means for winding a cord about the belt supporting pulleys, said means including a grooved roller adapted to guide the cord into closely arranged convolutions, said roller being automatically adjusted by the winding of the cord, and means to support the stretch of the belt between the spaced pulleys.

4. An apparatus for building endless cord belts including spaced belt supporting pulleys, a reel for the cord, a movable tensioning member engaged by the cord, clutch operated power means for normally unwinding the cord, and electrical means controlled by the member for operating the clutch.

5. An apparatus for building cord belts which comprises an endless, conveyor belt, and a pair of spaced pulleys so disposed above the belt that a band of belt material disposed on the pulleys can contact with the upper side of the conveyor belt.

6. An apparatus for building cord belts which comprises an endless, driven conveyor belt, and a pair of spaced pulleys so disposed above the belt that a band of belt material disposed on the pulleys can contact with the upper side of the conveyor belt, and means for winding a cord about the band of belt material as it moves about the pulleys.

7. An apparatus for winding a plurality of cords on a rotatable support, comprising means for rotating the support, and means for controlling the space between the cords as they are wound on the support, said last mentioned means comprising a screw having oppositely threaded portions and cord guiding elements mounted on the oppositely threaded portions of the screw.

8. An apparatus for winding a plurality of cords on a rotatable support, comprising means for rotating the support, and means for progressively varying the space between the cords as they are wound on the support, said last mentioned means comprising a screw having oppositely threaded portions and cord guiding elements mounted on the oppositely threaded portions of the screw, and operative connections between the screw and support for driving both simultaneously.

9. An apparatus for building endless belts which comprises a pair of spaced pulleys mounted on shafts supported at their ends in bearing brackets, the bracket at one end of each shaft being quickly removable from the shaft to permit training an endless band of belt material about the pulleys.

10. Apparatus for making endless, flat belts including a pair of spaced rotatable elements adapted to carry the belt during the building operations, means for adjusting the distance between the rotatable elements thereby controlling the size of the belt produced, means for supporting the belt between the rotatable elements, means for applying a plurality of cords simultaneously to the belt during the building operation, means for rotating the rotatable elements and means for moving the means supporting the belt between the rotatable elements.

11. Apparatus for making endless flat belts including a pair of spaced rotatable elements adapted to carry the belt during the building operations, means for supporting the belt between the rotatable elements, means for applying a plurality of cords simultaneously to the belt during the building operation, means for rotating the rotatable elements and means for moving the means supporting the belt between the rotatable elements.

12. Apparatus for making endless flat belts including a pair of spaced rotatable elements adapted to support the belt during the building operations, means for adjusting the distance between the rotatable elements thereby controlling the size of the belt produced, means for supporting the belt between the rotatable elements, means for applying a cord in convolute form to the belt during the building operation, means for rotating the rotatable elements, and means for moving the means supporting the belt between the rotatable elements.

13. Apparatus for making endless flat belts including a pair of spaced rotatable elements adapted to carry the belt during the building operations, means for supporting the belt between the rotatable elements, means for applying a cord in convolute form to the belt during the building operation, means for rotating the rotatable elements, and means for moving the means supporting the belt between the rotatable elements.

14. An apparatus for building cord belts which comprises spaced belt supporting means, means for winding a cord about the belt supporting means, a reel for the cord, power driven means for normally unwinding the cord from the reel, and electrically operated means for automatically releasing the power driven means to control the unwinding of the cord from the reel.

15. The method of making belts which includes the steps of building an endless band of rubberized fabric, supporting the band in a slack condition, winding a plurality of convolutions of cord about the slack band of fabric whereby the slack is taken up in a plurality of slight puckers of the fabric about the cords, and thereafter vulcanizing the assembly.

16. The method of making belts which includes the steps of building an endless band of rubberized fabric, supporting the band in a slack condition, applying a belt core about the slack band of fabric whereby the slack is taken up in a plurality of slight puckers of the fabric about the belt core, and thereafter vulcanizing the assembly.

WILLIAM H. GERSTENSLAGER.